3,763,109
SEGMENTED THERMOPLASTIC COPOLYESTERS
William K. Witsiepe, Wilmington, Del., assignor to E. I.
du Pont de Nemours and Company, Wilmington, Del.
No Drawing. Filed Aug. 19, 1971, Ser. No. 173,230
Int. Cl. C08g *17/08*
U.S. Cl. 260—75 R    16 Claims

ABSTRACT OF THE DISCLOSURE

Segmented thermoplastic copolyesters containing recurring long chain ester units derived from dicarboxylic acids and long chain glycols and short chain ester units derived from dicarboxylic acids and low molecular weight diols. At least 70% of the dicarboxylic acid used is terephthalic acid and at least 70% of the low molecular weight diol is 1,4-butanediol. The short chain ester units constitute about 66–95% by weight of the polymer. Such copolyesters rapidly harden from the molten state and have outstanding physical properties over a broad temperature range and good resistance to solvents and to heat aging.

BACKGROUND OF THE INVENTION

Linear copolyesters have been produced heretofore for various purposes, particularly for the production of films and fibers; but known polymers of this type have not been as effective as would be desired for some applications such as, for example, hydraulic hose where resistance to hydraulic fluids at elevated temperature, high initial modulus at high temperature, and low temperature flexibility are required. Moreover, known copolyesters generally harden very slowly from the molten state which greatly reduces their effectiveness in injection molding and extrusion applications. There has been a need, therefore, for a thermoplastic copolyester combining rapid hardening rates with superior low and high temperature properties and resistance to solvents and to heat aging.

SUMMARY OF THE INVENTION

According to this invention there is provided a thermoplastic copolyester consisting essentially of a multiplicity of recurring intralinear long chain and short chain ester units connected head-to-tail through ester linkages, said long chain ester units being represented by the following structure:

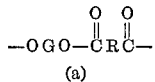

(a)

and said short chain ester units being represented by the following structure:

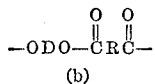

(b)

wherein:

G is a divalent radical remaining after removal of terminal hydroxyl groups from poly(alkylene oxide) glycols having a carbon-to-oxygen ratio of about 2.0–4.3 and a molecular weight above about 400;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250;

with the provisos that the short chain ester units constitute about 66–95% by weight of the copolyester, at least about 70% of the R groups must be 1,4-phenylene radicals, at least about 70% of the D groups must be 1,4-butylene radicals, and the sum of the percentages of the R groups which are not 1,4-phenylene radicals and of the D groups which are not 1,4-butylene radicals cannot exceed about 30%.

DETAILED DESCRIPTION

The term "long chain ester units" as applied to units in a polymer chain refers to the reaction product of a long chain glycol with a dicarboxylic acid. Such "long chain ester units," which are a repeating unit in the copolyesters of this invention, correspond to Formula a above. The long chain glycols are polymeric glycols having terminal (or as nearly terminal as possible) hydroxy groups and a molecular weight above about 400 and preferably from about 400–4000. The long chain glycols used to prepare the copolyesters of this invention are poly-(alkylene oxide) glycols having a carbon-to-oxygen ratio of about 2.0–4.3. Representative long chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by Formula b above.

Included among the low molecular weight diols (other than 1,4-butanediol) which react to form short chain ester units are acyclic, alicyclic, and aromatic dihydroxy compounds. Preferred are diols with 2–15 carbon atoms such as ethylene, propylene, tetramethylene, pentamethylene, 2,2-dimethyltrimethylene, hexamethylene, and decamethylene glycols, dihydroxy cyclohexane, cyclohexane dimethanol, resorcinol, hydroquinone, 1,5 - dihydroxy naphthalene, etc. Especially preferred are aliphatic diols containing 2–8 carbon atoms. Included among the bisphenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids (other than terephthalic acid) which are reacted with the foregoing long chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethyl-malonic acid, allyl-malonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic and isophthalic acids, bibenzoic acid, substituted dicarboxy compounds with two benzene nuclei such as bis(p-carboxyphenyl)methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$-$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are a preferred class for preparing the copolyester polymers of this invention. Among the aromatic acids, those with 8–16 carbon atoms are preferred, particularly the phenylene dicarboxylic acids, i.e., phthalic and isophthalic acids.

It is essential that at least about 70 mole percent of the dicarboxylic acid incorporated into the polymer be terephthalic acid and at least about 70 mole percent of the low molecular weight diol incorporated into the polymer be 1,4-butanediol. This means that 70% of the total R groups in Formula a plus Formula b above are 1,4-phenylene radicals. Thus, fewer than 70% of the R groups in either of Formula a or Formula b can be 1,4-phenylene radicals provided that at least 70% of the total R radicals in both formulas are 1,4-phenylene radicals. At least about 70% of the D groups in Formula b above are 1,4-butylene radicals (derived from 1,4-butanediol). A further requirement of the polymers of this invention is that the sum of the percentages of the R groups which are not 1,4-phenylene radicals and of the D groups which are not 1,4-butylene radicals cannot exceed about 30%. For example, if 30% of the low molecular weight diol molecules used are other than 1,4-butanediol, then all of the dicarboxylic acid used must be terephthalic acid, or if 10% of the low molecular weight diol molecules used are other than 1,4-butanediol, then at least about 80% of the dicarboxylic acid used must be terephthalic acid. Copolyesters having fewer 1,4-butylene terephthalate units than is assured by the foregoing proportions do not have sufficient rapid hardening rates. The D and R units which are not 1,4-butylene and 1,4-phenylene, respectively, can be derived from low molecular weight diols or dicarboxylic acids such as those named above.

Copolyesters containing polytetramethylene ether glycol residues in which 80–95% of the short chain ester units are butylene terephthalate units (i.e. polymers in which the sum of the percentages of R groups and D groups in Formula b above which are not 1,4-phenylene units or 1,4-butylene units, respectively, is about 5–20%) are preferred in applications requiring outstanding oil resistance. Copolyesters based on polytetramethylene ether glycol in which all of the short chain ester units are butylene terephthalate units embrittle (lose elastomeric character) at elevated temperatures in certain oils such as ASTM #1 oil, even though they are useful with a wide variety of other solvents. Copolyesters based on poly(propylene oxide) glycol do not embrittle even when only butylene terephthalate units are present.

Copolyesters containing mixed short chain ester units, i.e., polymers made from more than one kind of dicarboxylic acid and/or more than one kind of low molecular weight diol, are soluble in many partially halogenated aliphatic hydrocarbon solvents such as chloroform and 1,1,2-trichloroethane. This solubility is useful in solvent coating applications. In contrast, copolyesters based only on butylene terephthalate short chain units are insoluble in such solvents.

The copolyesters of this invention contain about 66–95% by weight short chain ester units corresponding to Formula b above, the remainder being long chain ester units corresponding to Formula a above. Copolyesters containing less than about 66% by weight short chain units exhibit lower initial modulus and reduced resistance toward solvents and heat aging, while copolyesters containing more than about 95 weight percent short chain units have poor low temperature properties and no longer exhibit elastomeric characteristics. The preferred range of short chain ester content is about 70–90% by weight.

Preferred copolyesters of this invention are those prepared from dimethyl terephthalate, 1,4-butanediol, and poly(tetramethylene oxide) glycol having a molecular weight of about 600–2000 or poly(ethylene oxide) glycol having a molecular weight of about 600–1500. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600. Up to 30 mole percent and preferably 10–25 mole percent of the dimethyl terephthalate can be replaced with dimethyl isophthalate or butanediol can be replaced with neopentyl glycol until up to about 30% and preferably 10–25% of the short chain ester units are derived from neopentyl glycol in these poly(propylene oxide) glycol polymers. The polymers based on poly (tetramethylene oxide) glycol are especially preferred because they are easily prepared, have overall superior physical properties, and are especially resistant to water.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol.

The polymers described herein can be made conveniently by a conventional ester interchange reaction. A preferred procedure involves heating the dimethyl ester of terephthalic acid with a long chain glycol and a molar excess of 1,4-butanediol in the presence of a catalyst at 150–260° C. while distilling off methanol formed by the ester interchange. Depending on temperature, catalyst, glycol excess, and equipment, this reaction can be completed within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as "polycondensation." Additional ester interchange occurs during this distillation to increase the molecular weight and to randomize the arrangement of the copolyester units. Best results are usually obtained if this final distillation or polycondensation is run at less than 1 mm. pressure and 240–260° C. for less than 2 hours in the presence of antioxidants such as sym-di-beta-naphthyl-p-phenylenediamine and 1,3,5-trimethyl-2,4,6-tris[3,5 - ditertiarybutyl - 4 - hydroxybenzyl]benzene. Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be used, organic titanates such as tetrabutyl titanate used alone or in combination with magnesium or calcium acetates are preferred. Complex titanates, such as $Mg[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

Although the copolyesters of this invention possess many desirable properties, it is advisable to stabilize certain of the compositions to heat or radiation by ultraviolet light. This can be done by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4'-bis(2,6-ditertiary-butylphenol), 1,3,5-trimethyl-2,4,6,-tris[3,5 - ditertiary - butyl-4-hydroxybenzyl]benzene and 4,4'-butylidene-bis(6 - tertiary - butyl-m-cresol). Various inorganic metal salts or hydroxides can be used as well as organic complexes such as nickel dibutyl dithiocarbamate, manganous salicylate and copper 3-phenylsalicylate. Typical amine stabilizers include N,N'-bis (beta-naphthyl)-p-phenylenediamine, N,N'-bis(1-methylheptyl)-p-phenylenediamine and either phenyl-betanaphthyl amine or its reaction products with aldehydes. Mixtures of hindered phenols with esters of thiodipropionic acid, mercaptides, and phosphite esters are particularly useful. Additional stabilization to ultraviolet light can be obtained by compounding with various UV absorbers such as substituted benzophenones or benzotriazoles.

The properties of these copolyesters can be modified by incorporation of various conventional inorganic fillers such as carbon black, silica gel, alumina, clays, and chopped fiber glass. In general, these additives have the effect of increasing the modulus of the material at various elongations. Compounds having a range of hardness values can be obtained by blending hard and soft polyesters of this invention.

The copolyesters of this invention have an outstanding balance of properties. In spite of their relatively low concentration of long chain ester units, the copolyesters have surprisingly good low temperature properties. The incorporation of only 5% by weight of polytetramethylene ether terephthalate units into poly(butylene terephthalate) reduces the brittle temperature from 0° C. to —40° C. At the same time, the copolyesters have useful tensile properties at temperatures as high as 200° C. unlike similar prior art compositions containing less than 66% short chain ester units. In addition, the copolyesters of this invention retain their strength after extended exposure to a variety of organic fluide (including hydraulic fluids) at temperatures as high as 120–150° C., which is in contrast to the performance of prior art copolyesters. Similar advantages are provided by the copolyesters in heat aging. For instance, after aging for 2 weeks at 150° C., the modulus at 100% extension is virtually unchanged for the instant copolyesters, while similar prior art compositions lose most of their strength and elastomeric character when subjected to similar treatment.

Because the polymers of this invention have relatively low melt viscosity, (particularly at low shear), excellent thermal stability at processing temperature, rapid hardening rates, good flow and mold wetting characteristics, and relative insensitivity to moisture, they may be processed by substantially all procedures which have been used for thermoplastics in general, and in many instances, they offer significant processing advantage over competitive thermoplastic polymers. They are especially effective in injection molding and high speed extrusion applications because of their rapid hardening rates. The materials can be injection, compression, transfer and blow molded to form articles which may include inserts, if desired, meeting close tolerances. Because of their melt viscosity and stability, they can be used for melt and puddle casting. They can be readily extruded to produce films (blown or unblown), tubing, other forms having complicated cross-sections, and cross-heat extruded for hose, wire, cable, and other substrate covers. They can be melt spun to form fibers and filaments. They can be readily calendered to produce films and sheeting or to produce calender-coat woven and non-woven fabrics and other substances.

In finely divided form, the polymers of this invention offer the above-mentioned processing advantages for procedures employing powdered thermoplastics. In addition, they can be used in crumb form. The unique flow characteristics of these polymers give excellent definition on molded surfaces and facilitate fusion bonding procedures such as rotational molding (either one or two axis methods), slush molding, and centrifugal molding as well as powder coating techniques such as fluidized bed, electrostatic spray, flame spray, flock coating, powder flow coating, cloud chamber, and heat fused coating (for flexible substrates).

The melt viscosity and stability characteristics of these polymers offer advantages for use in certain coating and adhesive procedures such as dip, transfer, roller, and knife coating and hot melt adhesives. These same advantages are useful in various combining and laminating operations such as hot roll, web, and flame laminating as well as other thermoplastic heat sealing processes. The low melt viscosity of these polymers permits the use of more delicate substrates in combining, laminating, and calendering operations and allows penetration into the substrate, if desired.

All parts, proportions, and percentages disclosed herein are by weight unless otherwise indicated. The following examples further illustrate the invention.

EXAMPLES

The following ASTM methods are employed in determining the properties of the polymers prepared in the examples which follow.

Modulus at 100% elongation, $M_{100}$ ---------- D412
Modulus at 300% elongation, $M_{300}$ ---------- D412
Modulus at 500% elongation, $M_{500}$ ---------- D412
Tensile at break, $T_B$ ---------------------- D412
Elongation at break, $E_B$ ------------------- D412
Flexural modulus ------------------------- D797
Hardness, Shore D ----------------------- D1484
Oil swell -------------------------------- D471
Brittle temperature ---------------------- D746

The following catalysts are used in preparing the compositions of the examples:

Catalyst A

Solution 1 is prepared by dissolving 111.05 ml. of tetrabutyl titanate in 900 ml. of dry butanol-1.

Solution 2 is prepared by dissolving 3 g. of anhydrous magnesium acetate in 100 ml. of dry methanol.

In the examples which follow, 2 parts by volume of Solution 1 mixed with 1 part by volume of Solution 2 is used.

Catalyst B

To 200 ml. of dry methanol is added 11.2 g. of anhydrous magnesium acetate and the mixture is refluxed for 2 hours. The resulting solution is cooled to room temperature and 44.4 ml. of tetrabutyl titanate and 150 ml. of 1,4-butanediol are added with mixing.

Example 1

Copolyester 1–A is prepared by placing the following materials in an agitated flask fitted for distillation:

| | Parts |
|---|---|
| Polytetramethyleneether glycol; number average molecular weight about 975 | 14.0 |
| 1,4-butanediol | 25.5 |
| Dimethyl terephthalate | 38.0 |
| Sym-di-beta-naphthyl-p-phenylenediamine | 0.17 |
| Catalyst A | 0.4 |

A stainless steel stirrer with a paddle cut to conform with the internal radius of the flask is positioned about 1/8" from the bottom of the flask and agitation is started. The flask is placed in an oil bath at 160° C., agitated for five minutes and then the catalyst is added. Methanol distills from the reaction mixture as the temperature is slowly raised to 250° C. over a period of one hour. When the temperature reaches 250° C. the pressure is gradually reduced to 0.3 mm. Hg within 20 minutes. The polymerization mass is agitated at 250 C./0.3 mm. Hg for 60 minutes. The resulting viscous molten product is scraped from the flask in a nitrogen (water and oxygen free) atmosphere and allowed to cool. The inherent viscosity of the product at a concentration of 0.1 g./dcl. in m-cresol at 30° C. is 1.63. Samples for physical testing are prepared by compression molding at about 240° C. for one minute and cooling rapidly in the press. The polymer has a Shore D hardness of about 60.

A second polymer (I–B) containing a higher proportion of short chain ester units is prepared by substantially the same procedure from the following materials:

| | Parts |
|---|---|
| Polytetramethyleneether glycol; number average molecular weight about 975 | 11.95 |
| 1,4-butanediol | 27.55 |
| Dimethyl terephthalate | 40.5 |
| Sym-di-beta-naphthyl-p-phenylenediamine | 0.18 |
| Catalyst A | 0.4 |

This polymer has an inherent viscosity in m-cresol of 1.49 and a Shore D hardness of 63.

A prior art control polymer is also prepared by the same procedure from the following materials:

| | Parts |
|---|---|
| Polytetramethyleneether glycol; number average molecular weight about 975 | 38.5 |
| 1,4-butanediol | 36.5 |
| Dimethyl terephthalate | 60.0 |
| Sym-di-beta-naphthyl-p-phenylenediamine | 0.30 |
| Catalyst A | 0.71 |

The control has an inherent viscosity of 1.65 and a Shore D hardness of 55.

Properties of copolyesters 1–A and 1–B and the control polymer are shown in Table I.

TABLE I

| | 1-A | 1-B | Control |
|---|---|---|---|
| Short chain ester units, percent by weight | 71.5 | 76.0 | 57.8 |
| Stress/strain at 25° C.: | | | |
| Tensile strength, p.s.i. | 7,650 | 6,900 | 6,450 |
| Elongation at break, percent | 525 | 510 | 765 |
| 100% modulus, p.s.i. | 2,660 | 2,860 | 2,150 |
| 300% modulus, p.s.i. | 3,560 | 3,960 | 2,525 |
| 500% modulus, p.s.i. | 6,780 | 6,650 | 3,900 |
| Stress/strain at 200° C.: | | | |
| Tensile strength, p.s.i. | 2,000 | 1,900 | |
| Elongation at break, percent | 570 | 525 | |
| 100% modulus, p.s.i. | 525 | 650 | (¹) |
| 300% modulus, p.s.i. | 875 | 1,045 | |
| 500% modulus, p.s.i. | 1,650 | 1,950 | |
| Properties at 25° C. after immersion for 7 days at 121° C. in Texaco Type "A" transmission fluid (hydrocarbon type): | | | |
| Tensile strength, p.s.i. | 3,240 | 3,830 | 2,150 |
| Elongation at break, percent | 275 | 275 | 75 |
| 100% modulus, p.s.i. | 2,800 | 3,070 | |
| Percent volume increase | 5.5 | 4.7 | 8.2 |
| Properties at 25° C. after immersion for 7 days at 121° C. in Skydrol 500A (isooctyl diphenyl phosphate): | | | |
| Tensile strength, p.s.i. | 4,950 | 5,250 | 3,430 |
| Elongation at break, percent | 400 | 405 | 365 |
| 100% modulus, p.s.i. | 2,830 | 3,050 | 1,925 |
| 300% modulus, p.s.i. | 3,735 | 3,920 | 2,575 |
| Percent volume increase | 19.9 | 16.8 | 32.7 |

¹ Too soft to test.

Example 2

Three polyester compositions are prepared from the following ingredients substantially by the procedure of Example 1. To facilitate removal from the reactor, the polymerization masses are heated to 260° C. just prior to isolation.

|  | 2-A | 2-B | Control |
|---|---|---|---|
| Polytetramethyleneether glycol; number average molecular weight about 975, parts | 7.17 | 2.68 | |
| 1,4-butanediol, parts | 33.8 | 33.9 | 37.6 |
| Dimethyl terephthalate, parts | 50.0 | 51.6 | 54.0 |
| Sym-di-beta-naphthyl-p-phenylenediamine | 0.2 | 0.2 | 0.2 |
| Catalyst A | 0.4 | 0.4 | 0.4 |

Copolyesters 2–A and 2–B are within the limits of this invention. The control is a prior art polymer.

Properties of the three polymers are shown in Table II. Samples for testing are prepared by compression molding at 240–250° C.

TABLE II

|  | 2-A | 2-B | Control |
|---|---|---|---|
| Short chain ester units, percent by weight | 87.5 | 95.0 | 100 |
| Room temperature properties: | | | |
| $M_{100}$, p.s.i. | 3,800 | | |
| $M_{300}$, p.s.i. | 3,900 | | |
| $T_B$, p.s.i. | 7,300 | 6,800 | 4,900 |
| $E_B$, percent | 400 | 10 | 5 |
| Hardness, Shore D | 72 | 78 | 82 |
| Brittle temperature, °C | <−60 | −40 | 0 |
| Flexural modulus, p.s.i. | 117,000 | 276,180 | 380,900 |
| 150° C. properties: | | | |
| $M_{100}$, p.s.i. | 1,170 | 1,375 | 1,600 |
| $M_{300}$, p.s.i. | 2,500 | 2,900 | 2,970 |
| $T_B$, p.s.i. | 4,080 | 4,390 | 3,690 |
| $E_B$, percent | 450 | 400 | 360 |

The copolyesters of this invention exhibit excellent properties at both low and high temperatures. However, the control polymer, while having useful high temperature properties, embrittles at 0° C.

Example 3

Two copolyesters (3–A and 3–B) are prepared substantially by the procedure of Example 1 using the following materials:

|  | 3-A | 3-B |
|---|---|---|
| Polytetramethyleneether glycol; number average molecular weight about 975, parts | 10.7 | 10.7 |
| 1,4-Butanediol, parts | 30.0 | 30.0 |
| Dimethyl terephthalate, parts | 36.45 | 36.45 |
| Dimethyl isophthalate, parts | 3.65 | |
| Dimethyl phthalate, parts | | 3.65 |
| Sym-di-beta-naphthyl-p-phenylenediamine, parts | 0.2 | 0.2 |
| Catalyst A, parts | 0.4 | 0.4 |

The properties of these copolyesters are shown in Table III. For comparison, the properties of the prior art control polymer prepared in Example 1 are also shown in Table III.

TABLE III

|  | 3-A | 3-B | Control[1] |
|---|---|---|---|
| Inherent viscosity | 1.47 | 1.44 | 1.65 |
| Short chain ester units, percent by weight | 78.3 | 78.3 | 57.8 |
| Percentage of butylene terephthalate units | 91 | 91 | 100 |
| Properties at 25° C.: | | | |
| Tensile strength, p.s.i. | 8,360 | 6,650 | 6,600 |
| Elongation at break, percent | 545 | 600 | 740 |
| 100% modulus, p.s.i. | 2,525 | 2,475 | 2,180 |
| Hardness, Shore D | 63 | 63 | 55 |
| Properties at 25° C. after immersion for 7 days at 150° C. in ASTM No. 1 oil: | | | |
| Tensile strength, p.s.i. | 5,500 | 5,200 | 2,730 |
| Elongation at break, percent | 620 | 620 | 480 |
| 100% modulus, p.s.i. | 3,050 | 2,700 | 2,560 |
| Properties at 25° C. after aging at 150° C. for 14 days in air: | | | |
| Tensile strength, p.s.i. | 5,400 | 4,500 | 1,660 |
| Elongation at break, percent | 590 | 585 | 10 |
| 100% modulus, p.s.i. | 2,650 | 2,700 | |

[1] Example 1.

Example 4

A copolyester is prepared from the following materials:

| | Parts |
|---|---|
| Polypropyleneether glycol, number average molecular weight about 1000 | 11.8 |
| 1,4-butanediol | 25.7 |
| Dimethyl terephthalate | 31.2 |
| Dimethyl isophthalate | 7.8 |
| Sym-di-beta-naphthyl-p - phenylenediamine | 0.17 |
| Catalyst B | 0.36 |

The procedure of Example 1 is used to prepare the polymer with the exception that polycondensation is continued for 90 minutes at about 255–260° C. and <0.1 mm. Hg.

The polymer has an inherent viscosity of 1.36 in m-cresol. The properties of the copolyester are shown in Table IV–A.

Table IV–A

| | |
|---|---|
| Short chain ester units, percent by weight | 76 |
| $M_{100}$, p.s.i. | 1950 |
| $M_{200}$, p.s.i. | 2120 |
| $M_{300}$, p.s.i. | 2870 |
| $T_B$, p.s.i. | 7300 |
| $E_B$, percent | 575 |
| Trouser tear 50″/min., p.l.i.[1] | 381 |
| Hardness, Shore D | 57 |

[1] ASTM D-470 modified by use of 1.5″ x 3″ sample with a 1.5″ cut on the long axis of the sample. This configuration prevents "necking down" at the point of tearing.

A second copolyester based on polypropyleneether glycol is prepared by the procedure of this example from the following materials:

| | Parts |
|---|---|
| Polypropyleneether glycol, number average molecular weight about 1000 | 11.7 |
| 1,4-butanediol | 20.2 |
| 2,2-dimethyl-1,3-propanediol | 5.9 |
| Dimethyl terephthalate | 38.7 |
| Sym-di-beta-naphthyl-p-phenylenediamine | 0.17 |
| Catalyst B | 0.36 |

The resulting copolyester has an inherent viscosity of 1.23 in m-cresol. Its properties are shown in Table IV–B.

Table IV–B

| | |
|---|---|
| Short chain ester units, percent by weight | ~76 |
| $M_{100}$, p.s.i. | 1800 |
| $M_{200}$, p.s.i. | 1950 |
| $M_{300}$, p.s.i. | 2160 |
| $T_B$, p.s.i. | 6000 |
| $E_B$, percent | 555 |
| Trouser tear, 50″/min., p.l.i.[1] | 428 |
| Hardness, Shore D | 58 |

[1] See footnote Table IV–A.

Example 5

A poly(ethylene oxide)glycol-based copolyester is prepared substantially by the procedure of Example 1 from the following materials:

| | Parts |
|---|---|
| Poly(ethylene oxide)glycol, number average molecular weight about 1000 | 20.9 |
| 1,4-butanediol | 46.7 |
| Dimethyl terephthalate | 68.0 |
| Sym-di-beta-naphthyl-p-phenylenediamine | 0.3 |
| Catalyst A | 1.0 |

The copolyester has an inherent viscosity of 1.57 in m-cresol, a Shore D hardness of 64, and contains 75.4% by weight short chain ester units.

The properties of the copolyester are shown in Table V.

Table V

| | |
|---|---|
| Properties at 150° C.: | |
| Tensile strength, p.s.i. | 4200 |
| Elongation at break, percent | 350 |
| 100% modulus, p.s.i. | 3110 |
| 300% modulus, p.s.i. | 3250 |
| Properties at 150° C.: | |
| Tensile strength, p.s.i | 3500 |
| Elongation at break, percent | 580 |
| 100% modulus, p.s.i. | 1300 |
| 300% modulus, p.s.i. | 1795 |
| 500% modulus, p.s.i. | 3200 |
| Brittle temperature, ° C. | −57 |

Example 6

A copolyester is prepared by placing the following materials in a flask equipped for distillation and additionally equipped with a close fitting agitator.

| | |
|---|---:|
| Polytetramethylene ether glycol number average molecular weight about 1000 _____g__ | 17.8 |
| Dimethyl terephthalate _____g__ | 38.1 |
| 1,4-butanediol _____ml__ | 36.1 |
| Sym-dig-beta-naphthyl-p-phenylenediamine ___ml__ | 0.3 |
| Catalyst solution [1] _____ml__ | 0.3 |

[1] The catalyst solution is prepared by dissolving 1.41 g. of magnesium turnings in 300 ml. of anhydrous butanol-1. Solution is effected by refluxing for 4 hours, after which 36.0 g. of tetrabutyl titanate is added and reflux continued for one hour. The catalyst solution is cooled and bottled unil required.

The flask is placed in an oil bath at 200° C. for 90 minutes to effect transesterfication. The bath is heated to 260° C. and the pressure carefully reduced to about 0.5 mm. Hg. The conditions are maintained for about 90 minutes. The resulting polymer is removed from the flask in a nitrogen atmosphere. It has an inherent viscosity of 1.57 at 30° C. at a concentration of 0.5 g./dcl. in a mixed solvent of 60 parts by volume phenol/40 parts by volume 1,1,2,2-tetrachloorethane. Samples for physical testing are prepared by compression molding at about 220° C.

The copolyester has the following physical properties.

| | |
|---|---:|
| Short chain ester units, percent by weight _____ | 66.1 |
| Properties at 70° C.: | |
|   100% modulus, p.s.i. _____ | 1500 |
|   300% modulus, p.s.i. _____ | 1950 |
|   Tensile strength, p.s.i. _____ | [1]>4200 |
|   Elongation at break, percent _____ | [1]>690 |
|   Tear strength, D-470, p.l.i. _____ | 170 |
| Compression set, ASTM D-395 Method B, 22 hr./70° C. _____ | 48 |

[1] No break.

What is claimed is:

1. A segmented thermoplastic copolyester consisting essentially of a multiplicity of recurring long chain ester units and short chain ester units joined head-to-tail through ester linkages, said long chain ester units being represented by the formula (I) 

and said short chain units being represented by the formula (II) 

where G is a divalent radical remaining after the removal of terminal hydroxyl groups from a poly(alkylene oxide) glycol having a molecular weight of about 400-4000 and a carbon-to-oxygen ratio of about 2.0-4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided, (a) said short chain ester units amount to about 66-95% by weight of said copolyester,
(b) at least about 70% of the R groups in Formulae I and II are 1,4-phenylene radicals and at least about 70% of the D groups in Formula II are 1,4-butylene radicals, and
(c) the sum of the percentages of R groups in Formulae I and II which are not 1,4-phenylene radicals and of D groups in Formula II which are not 1,4-butylene radicals does not exceed about 30.

2. A segmented thermoplastic copolyester of claim 1 wherein substantially all of the dicarboxylic acid is terephthalic acid.

3. A segmented thermoplastic copolyester of claim 1 wherein the dicarboxylic acid is about 70-100% terephthalic acid and 0-30% isophthalic acid.

4. A segmented thermoplastic copolyester of claim 1 wherein the dicarboxylic acid is about 70-100% terephthalic acid and about 0-30% phthalic acid.

5. A segmented thermoplastic copolymer of claim 1 wherein substantially all of the diol having a molecular weight less than 250 is 1,4-butanediol.

6. A segmented copolyester of claim 1 wherein the poly(alkylene oxide) glycol is poly(tetramethylene oxide) glycol having a molecular weight of about 600-2000.

7. A segmented copolyester of claim 1 wherein the short chain ester units constitute about 70-90% by weight of the polymer.

8. A segmented copolyester of claim 1 wherein the dicarboxylic acid is about 70-100 mole percent terephthalic acid, about 0-30 mole percent isophthalic acid and about 0-30 mole percent phthalic acid; the poly(alkylene oxide) glycol is poly(tetramethylene oxide) glycol having a molecular weight of about 600-2000 and the diol having a molecular weight less than 250 is 1,4-butanediol.

9. A segmented copolyester of claim 8 wherein the short chain ester units constitute about 70-90% by weight of the polymer.

10. A segmented copolyester of claim 9 wherein substantially all of the dicarboxylic acid is terephthalic acid.

11. A segmented copolyester of claim 9 wherein the dicarboxylic acid is 80-95 mole percent terephthalic acid and 5-20 mole percent of at least one of isophthalic acid and phthalic acid.

12. A segmented copolyester of claim 1 wherein the dicarboxylic acid is 70-100 mole percent terephthalic acid and 0-30 mole percent isophthalic acid; the diol having a molecular weight less than 250 is 70-100 mole percent 1,4-butanediol and 0-30 mole percent neopentyl glycol and the poly(alkylene oxide) glycol is poly(propylene oxide) glycol having a molecular weight of about 600-1600.

13. A segmented copolyester of claim 12 wherein the short chain ester units constitute 70-90% by weight of the polymer.

14. A segmented copolyester of claim 13 wherein the dicarboxylic acid is 75-90 mole percent terephthalic acid and 10-25 mole percent isophthalic acid.

15. A segmented copolyester of claim 13 wherein 75-90 mole percent of the diol having a molecular weight less than 250 is 1,4-butanediol and 10-25 mole percent of said diol is neopentyl glycol.

16. A segmented copolyester of claim 1 wherein the dicarboxylic acid is 70-100 mole percent terephthalic acid, 0-30 mole percent isophthalic acid, and 0-30 mole percent phthalic acid; the diol having a molecular weight less than 250 is 1,4-butanediol and the poly(alkylene oxide) glycol is poly(ethylene oxide) glycol having a molecular weight of about 600-1500.

References Cited

UNITED STATES PATENTS

| | | | |
|---|---|---|---:|
| 3,023,192 | 2/1962 | Shivers _____ | 260—75 |
| 3,651,014 | 3/1972 | Witsiepe _____ | 260—75 R |

OTHER REFERENCES

Nishimura et al.: J. Macromol. Sci., part A 1 (4), 617-25 (1967).

MELVIN GOLDSTEIN, Primary Examiner

U.S. Cl. X.R.

260—33.8 R, 40 R, 45.7 R, P, S, 45.75 R, C, N 45.85, 45.9 R, 45.95